(12) United States Patent
Hill

(10) Patent No.: US 7,834,564 B2
(45) Date of Patent: Nov. 16, 2010

(54) ACTUATING DEVICE FOR MOTOR VEHICLE COMPONENTS

(75) Inventor: Wolfgang Hill, Karlsruhe (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 1088 days.

(21) Appl. No.: 11/301,531

(22) Filed: Dec. 13, 2005

(65) Prior Publication Data

US 2006/0137919 A1 Jun. 29, 2006

(30) Foreign Application Priority Data

Dec. 18, 2004 (DE) .................. 10 2004 061 018

(51) Int. Cl.
*H02P 5/00* (2006.01)

(52) U.S. Cl. .................. 318/40; 318/34; 307/10.1; 74/335

(58) Field of Classification Search .................. 318/40, 318/80, 564, 594, 630, 34; 477/94; 74/335, 74/339, 471 XY, 473.12; 307/10.1; 359/877
See application file for complete search history.

(56) References Cited

U.S. PATENT DOCUMENTS

| | | | | |
|---|---|---|---|---|
| 3,735,228 A * | 5/1973 | Redmond | .................. | 318/564 |
| 4,856,360 A * | 8/1989 | Yoshimura et al. | ............. | 74/335 |
| 4,911,031 A * | 3/1990 | Yoshimura et al. | ............. | 74/335 |
| 5,241,250 A * | 8/1993 | Nagasawa et al. | ........... | 318/591 |
| 5,610,493 A * | 3/1997 | Wieloch | .................. | 318/801 |
| 5,623,191 A * | 4/1997 | Wieloch | .................. | 318/801 |
| 5,699,609 A * | 12/1997 | Wieloch | .................. | 29/830 |
| 5,749,060 A * | 5/1998 | Graf et al. | .................. | 340/439 |
| 5,832,777 A * | 11/1998 | Weilant | .................. | 74/335 |
| 5,992,254 A * | 11/1999 | Machado | .................. | 74/335 |
| 6,053,543 A * | 4/2000 | Arabia et al. | ............... | 292/201 |
| 6,070,485 A * | 6/2000 | Funk et al. | ............... | 74/473.12 |
| 6,070,563 A * | 6/2000 | Achenbach et al. | ..... | 123/195 R |
| 6,166,498 A | 12/2000 | Yamaguchi et al. | | |
| 6,213,612 B1 * | 4/2001 | Schnell et al. | ............... | 359/877 |
| 6,229,226 B1 * | 5/2001 | Kramer et al. | ............. | 307/10.1 |
| 6,230,576 B1 * | 5/2001 | Yamada et al. | ................ | 74/335 |
| 6,281,649 B1 | 8/2001 | Ouellette et al. | | |
| 6,322,146 B1 * | 11/2001 | Fisher | .................. | 297/362.14 |
| 6,340,231 B1 * | 1/2002 | Polzer | .................. | 359/872 |
| 6,384,561 B1 * | 5/2002 | Niizuma et al. | | |
| 6,419,368 B1 * | 7/2002 | Guttenberger et al. | | |
| 6,467,920 B2 * | 10/2002 | Schnell et al. | | |
| 6,476,515 B1 * | 11/2002 | Yamamoto et al. | ......... | 307/10.1 |
| 6,511,106 B2 * | 1/2003 | Perkins et al. | ............. | 292/216 |
| 6,515,850 B2 * | 2/2003 | Fournier et al. | ............. | 361/627 |

(Continued)

FOREIGN PATENT DOCUMENTS

| EP | 1000790 | 5/2000 |
|---|---|---|
| EP | 1059723 | 12/2000 |

*Primary Examiner*—Paul Ip
(74) *Attorney, Agent, or Firm*—Davidson, Davidson & Kappel LLC

(57) ABSTRACT

A device for actuating components of a motor vehicle has at least two electric motors, each of which has at least one stator unit and one rotor unit, and a control device for the electric motors, which has at least one logic device and one power device. The control device is fixedly connected to at least one component of both electric motors.

25 Claims, 4 Drawing Sheets

U.S. PATENT DOCUMENTS

| | | | |
|---|---|---|---|
| 6,518,525 B1* | 2/2003 | Anastasia et al. | 200/61.91 |
| 6,629,589 B2* | 10/2003 | Inoue | 192/3.62 |
| 6,650,080 B1* | 11/2003 | Guttenberger | |
| 6,725,833 B1* | 4/2004 | Irihune et al. | 123/399 |
| 6,733,052 B2* | 5/2004 | Perkins et al. | 292/201 |
| 6,755,544 B2* | 6/2004 | Schnell et al. | |
| 6,822,353 B2* | 11/2004 | Koga et al. | 310/64 |
| 6,848,329 B2* | 2/2005 | Okada et al. | 74/339 |
| 6,904,823 B2* | 6/2005 | Levin et al. | 74/471 XY |
| 6,916,100 B2* | 7/2005 | Pavao | 359/841 |
| 6,918,675 B2* | 7/2005 | Kikuchi | |
| 7,005,821 B2* | 2/2006 | Sunaga et al. | 318/594 |
| 7,007,566 B2* | 3/2006 | Norum | 74/335 |
| 7,035,115 B2* | 4/2006 | Walesa | 361/788 |
| 7,104,152 B2* | 9/2006 | Levin et al. | 74/471 XY |
| 7,110,867 B2* | 9/2006 | Imazu | |
| 7,173,392 B2* | 2/2007 | Shinojima et al. | 318/630 |
| 7,204,785 B2* | 4/2007 | Berger et al. | 477/94 |
| 7,315,127 B2* | 1/2008 | Tajima | 315/82 |
| 7,317,290 B2* | 1/2008 | Gandrud et al. | 318/105 |
| 7,322,710 B2* | 1/2008 | Foote et al. | 359/876 |
| 7,350,432 B2* | 4/2008 | Somschor et al. | 74/335 |
| 7,350,433 B2* | 4/2008 | Yasui et al. | 74/335 |
| 7,374,511 B2* | 5/2008 | Berger et al. | 477/99 |
| 7,476,179 B2* | 1/2009 | Zenno | 477/174 |
| 2001/0010601 A1* | 8/2001 | Schnell et al. | 359/877 |
| 2002/0047675 A1* | 4/2002 | Hein | 318/34 |
| 2002/0109473 A1* | 8/2002 | Romanowich et al. | 318/434 |
| 2004/0012868 A1* | 1/2004 | Schnell et al. | 359/877 |
| 2004/0047054 A1* | 3/2004 | Kikuchi | 359/877 |
| 2004/0120096 A1* | 6/2004 | Apfelbacher et al. | 361/247 |
| 2004/0150271 A1* | 8/2004 | Koga et al. | 310/64 |
| 2004/0201972 A1* | 10/2004 | Walesa | 361/788 |
| 2004/0254040 A1* | 12/2004 | Somschor et al. | 475/149 |
| 2005/0231925 A1* | 10/2005 | Fukuda et al. | 361/760 |
| 2005/0231926 A1* | 10/2005 | Ito et al. | 361/765 |
| 2005/0233851 A1* | 10/2005 | Minagawa et al. | 475/5 |
| 2005/0247503 A1* | 11/2005 | Imazu | 180/300 |
| 2006/0086981 A1* | 4/2006 | Yamaguchi et al. | 257/347 |
| 2006/0128525 A1* | 6/2006 | Zenno | 477/115 |
| 2006/0138993 A1* | 6/2006 | Gandrud et al. | 318/727 |
| 2006/0201768 A1* | 9/2006 | Hori et al. | 192/84.1 |
| 2006/0261760 A1* | 11/2006 | Shinojima et al. | 318/34 |
| 2007/0082577 A1* | 4/2007 | Tajima | 445/66 |
| 2007/0135261 A1* | 6/2007 | Berger et al. | 477/96 |
| 2008/0252159 A1* | 10/2008 | Huck et al. | 310/71 |
| 2009/0011900 A1* | 1/2009 | Zenno | 477/80 |

* cited by examiner

ACTUATING DEVICE FOR MOTOR VEHICLE COMPONENTS

This claims the benefit of German Patent Application No. 10 2004 061 018.5, filed Dec. 18, 2004 and hereby incorporated by reference herein.

BACKGROUND OF THE INVENTION

The present invention relates to an actuating device for components, in particular for components of a motor vehicle. The actuation and/or control of various motor vehicle components such as shift transmissions or camshaft adjustment systems with the aid of electric motors is known from the related art. The term shift transmissions refers to automated transmissions based on manual transmissions and using essentially similar technologies. These include electronic clutch management (ECM), automated shift transmission (AST), uninterrupted shift transmission (UST), parallel shift transmission (PST), and electric shift transmission (EST).

In the related art, such actuating devices have one or more electric motors for actuating the respective components.

Electronically commuted (EC) motors are often used for this purpose in the related art. These motors have a stator having a rotating rotor inside. Furthermore, these motors have a control device, which has a logic device and a power device. The logic device is used to control the rotation of the rotor within the stator. The power device ensures the power supply.

Controlling a plurality of, for example, four, electric motors via a central control device or a central logic device is known from the related art.

A cable connection must be provided between the central logic device and the individual motors for this control. These cable connections have a plurality of plug-and-socket connections which usually represent unreliability factors, because in a motor vehicle specifically the entire actuating device is subjected to constant vibrations and therefore the plug-and-socket connections must be very high quality. In addition, the individual connections require a substantial installation space. Finally, the individual components such as cables, plugs, bearings, and seals between the individual elements also represent a significant cost factor in the manufacture of the actuating device.

FIG. 1 shows an actuating device according to the related art. It has four electric motor units 2, each of which has an electric motor 3. Each of electric motor units 2 has a housing 5, in which power devices 4 and logic devices 6 are situated in addition to motors 3. Together with trigger devices 6, power devices 4 form the power devices for actuating motors 3.

Each of housings 5 has a connecting device 7, which engages with first plug connector 8. Power is supplied from a battery 30 via this connecting device 7 and plug connectors 8. In addition, each individual housing 5 has a second connecting device 17, which engages with a second plug connector 18.

This second connector 17 and second plug connector 18 are used for connecting bus conductors 10, via which power devices 4 and logic devices 6 are connected to system logic device 20. It is apparent that in this way a plurality of conductors and thus also connectors and/or contact plugs are needed. As mentioned previously, these contact connections represent a source of faults within the actuating device, in particular in light of the fact that the actuating device is permanently exposed to vibrations.

Bus conductors 10 are also connected to the logic devices via connecting devices 27 and plug connectors 28, which represents a further source of faults for the overall system. The battery voltage is supplied to the logic device via leads 15 and 16.

BRIEF SUMMARY OF THE INVENTION

An object of the present invention is to provide an actuating device which has a higher reliability compared to the related art, needs less installation space, and may be manufactured in a more cost-effective way.

The device according to the present invention for actuating components of a motor vehicle has at least two electric motors, each of which has at least one stator unit and one rotor unit. Furthermore, the device has a control device for the electric motors, which has at least one logic device and one power device. According to the present invention, the control device is fixedly connected to at least one component of both electric motors.

An actuating device is understood to be a device that affects the respective component of the motor vehicle in a defined manner. Preferably, it is a device that affects the respective component of the motor vehicle mechanically, such as via one or more electric motors, which operate the components in a defined manner.

A control device for the electric motors is understood, in particular but not necessarily, as a device which essentially regulates the complete motor control, i.e., regulation of the power output to the motors and the control of the particular rotary position of the rotors with respect to the stators.

A fixed connection is understood as a fixed, i.e., friction-locked, connection rather than a mere cable connection, between the control device and at least one component of the electric motors. As a result, a plurality of conductors or cables may be omitted between the control device or part of the control device and the motors.

In a preferred embodiment, the control device and at least two electric motors are mounted in a shared housing. A housing is defined as a device which surrounds, at least partially, the devices to be housed. This may be a mechanically fabricated housing.

However, the term housing may also be defined as a plastic sheathing of two or more components which essentially fixedly connects these components.

By using housings or sheathings, a particularly stable connection between the components may be achieved.

In a further preferred embodiment, the device has a system logic device, which, in a particularly preferred manner, is fixedly connected to at least one component of the electric motors. A system logic device is understood as a higher-level logic device which preferably communicates with the individual control devices. This system logic device is preferably fixedly connected to at least one component of the electric motors as well as at least one control device.

In a further preferred embodiment, the control device is fixedly connected to the stator unit of at least one electric motor, preferably to the stator units of both electric motors. The stator units and the control device are first connected to one another and, after this assembly, the entire module is jointly sheathed and/or encapsulated. The entire module forms an electronic unit in this case.

In particular, the above-mentioned encapsulation or sheathing of the individual components makes the individual electric connections particularly unsusceptible to vibrations.

In a further preferred embodiment, the control device for each electric motor has at least one power device. These power devices preferably have the same design. In this way, each individual motor is controlled by a power device of essentially the same type and thus essentially in the same manner. However, it is also possible to select different power devices. This is of interest when different response characteristics are desirable for the individual electric motors.

In a further preferred embodiment, the control devices are in electrically conductive contact with the system logic device. The contact between the control devices and the system logic device is preferably implemented via surface contacts. A surface contact is understood to be a contact over a relatively large surface. These surface contacts may be implemented in particular, but not exclusively, using conductive adhesive or solder. The surface contacts have the advantage that no excessive heat is generated at the contact points.

In a particularly preferred embodiment, the logic device and the power device are particularly preferably situated on a shared cooling device. This is preferably a cooling element on which the logic device and the power device are mounted. Using this joint placement, a shared cooling device may be used for cooling both the power device and the logic device, as well as, in a particularly preferred manner, the system logic device. In a further preferred embodiment, this cooling device has a trough-shaped design.

The cooling device is preferably in direct contact with the heat-conducting elements of the logic device. This ensures that the generated heat is dissipated in a particularly efficient way, because the heat is dissipated in the same area where it is generated or to where it is conducted.

In a further preferred embodiment, the heat sources of the power device are essentially thermally insulated from the heat sources of the logic device. Individual components of the power device may reach temperatures in the range of 175° C. to 200° C. and therefore heat up considerably more than the components of the logic device. Thermal insulation, i.e., thermal separation, has the effect that no undesirable heating of the components of the logic device by the components of the power device occurs.

In a further preferred embodiment, the system logic device has a flat design. A flat design is understood as a component which extends in a defined manner in two directions, but only to a small degree in a third direction which is perpendicular to these predefined extension directions.

The flat design of the system logic device allows a particularly space-saving arrangement within the entire device.

In a further preferred embodiment, the cooling device has surface contacts to the power devices. These surface contacts render possible particularly efficient heat dissipation from the power devices to the cooling device.

In a further preferred embodiment, the control device and preferably also the system logic device are connected to the electric motors via a connecting device. This is preferably an adapter connector, which is preferably made of or has plastic-sheathed punched parts and/or flexible printed circuit boards. This adapter connector preferably simultaneously forms the plug to the vehicle and/or a motor shield of the controlled electric motors. This configuration makes it possible to achieve particularly efficient savings by omitting additional plugs and contacts. The outside dimensions of the control device are preferably standardized. This has the advantage that the individual control devices may be replaced by others and used in different actuating devices, for example, in different vehicle types.

In a further preferred embodiment, the connecting device has a motor shield for each electric motor. The motor shields of at least two provided electric motors are preferably connected to form one piece. Particularly preferably these motor shields form, at the same time, the electronic housing and the plug. In a further preferred embodiment, the motor shields contain metal parts to which the stator units of the electric motors are attached. In this way no detachable connections, which are therefore to be gasketed, exist between the stator unit and the motor shields. The manufacturing costs may thus be reduced and the reliability of the entire device may be increased, because there are fewer devices to be protected via gaskets or in another manner.

Furthermore, by positioning the stator units on the motor shields, a particularly durable connection may be provided between the individual stator units.

In a further preferred embodiment, sensor devices are situated on the motor shields. By placing the sensor devices on the motor shields, a precise alignment of the sensor device with respect to the stator units which are also situated on the motor shields is ensured. The sensor units are preferably provided for measuring the temperature of the device or for measuring the position of the rotor with respect to the stator. Other sensors such as moisture sensors and the like may also be used.

In a further preferred embodiment, the control device controls more than two electric motors. The additional electric motors may be situated in the same housing or also in a separate housing or in a plurality of separate housings. If the additional motors are situated in an additional housing, a connection is preferably provided between the control device and the second housing. In a further preferred embodiment, however, all motors may be accommodated in one housing, and the central control device may be fixedly connected to the housing.

In a further preferred embodiment, the shared housing has an injection molded element and/or is preferably designed as an injection molded element. This design increases the stability of the device.

In a further preferred embodiment, the rotor devices are fixedly connected to mechanical power transmission devices. The rotor devices of the electric motor are preferably fixedly connected to mechanical transmission elements such as gear transmissions and thus form the mechanical units of the devices.

In a particularly preferred manner, the bearing units of the rotor device and of the mechanical transmission elements (gear transmission parts) are combined into one of these mechanical units to save components and installation space. In this preferred embodiment, the stator units belong to the electronic unit and the rotor devices belong to the mechanical unit(s). The gasketed interfaces thus obtained between the electronic unit and the at least two mechanical units go through the electric motors.

The present invention is further directed to the use of an actuating device for actuating a component which is selected from a group of components including gear transmission systems, camshaft adjustment systems, and the like.

The present invention is further directed to a method for manufacturing an actuating unit for components of a motor vehicle, at least one component of at least two electric motors being connected to a control device to form a module in one step, and the module being sheathed with plastic or the like in a second method step.

The above-mentioned sheathing creates a housing around the module, within which the individual components of the module are fixedly situated with respect to one another.

The component of the electric motors is preferably connected to the control device via a connecting device. This means that a connecting device, i.e., an adapter connector, is situated between the electric motors and the control device to produce the mechanical and/or electric connection.

The component of the electric motors which is connected to the control device is preferably a stator unit.

In this way, the above-mentioned electronic part may be made available for actuating the entire device.

At least one sensor device and/or at least one plug device is preferably also connected to the control device. The stator units, the sensor devices and the plug devices are connected to the control device via the adaptor connector. All the above-named components forming the complete module are preferably sheathed and/or encapsulated.

Figure 2:
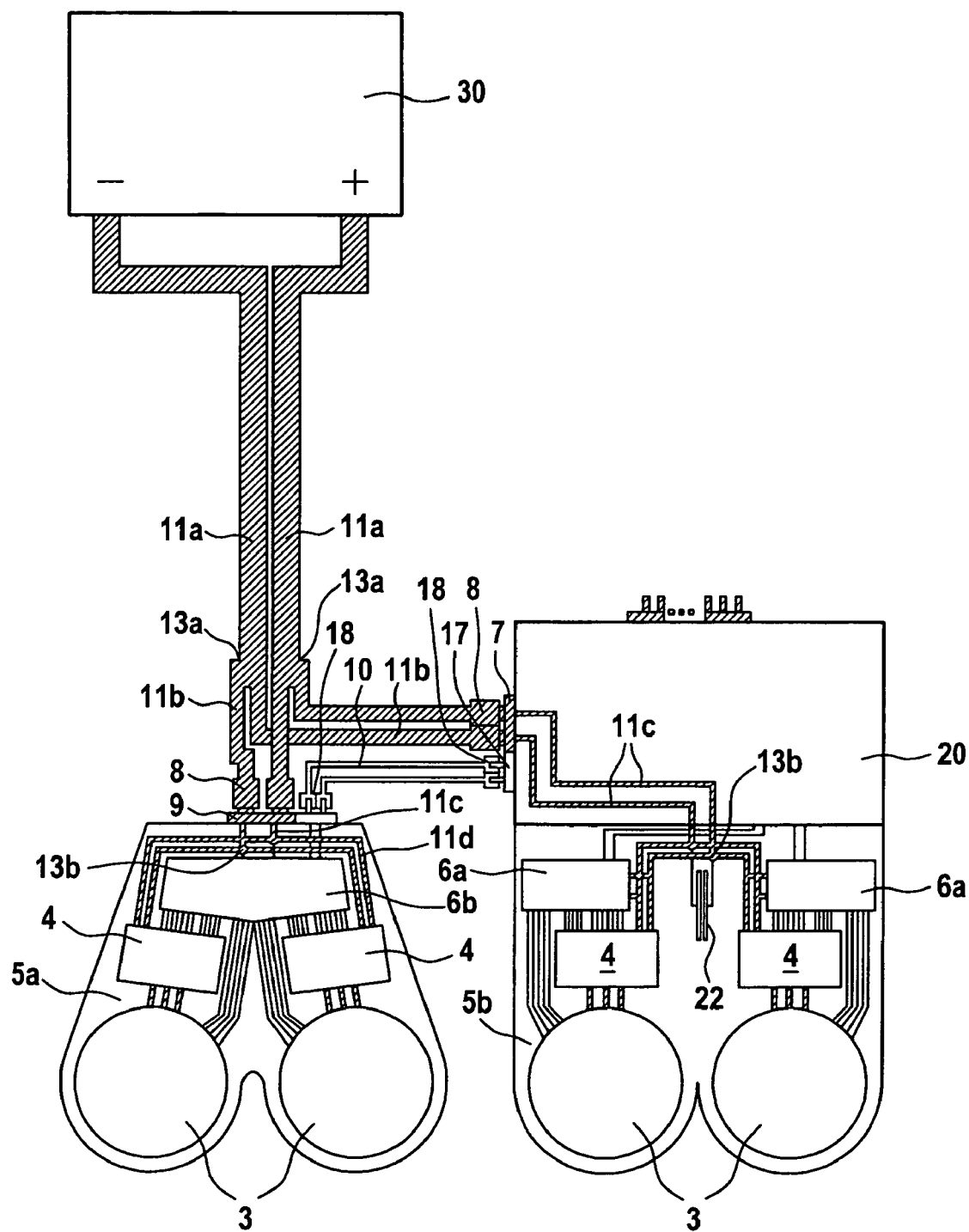
Figure 2A:
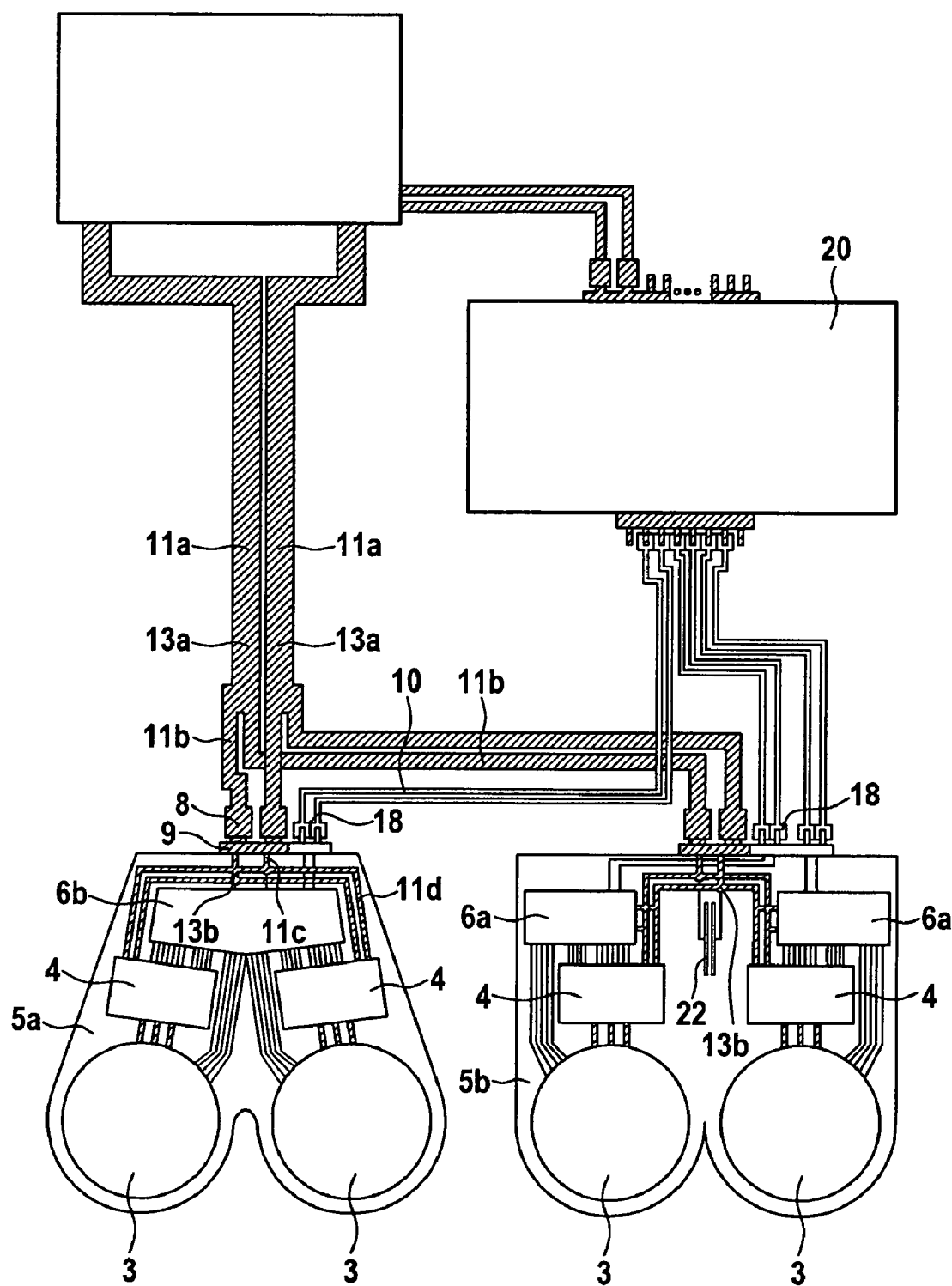
Figure 3:
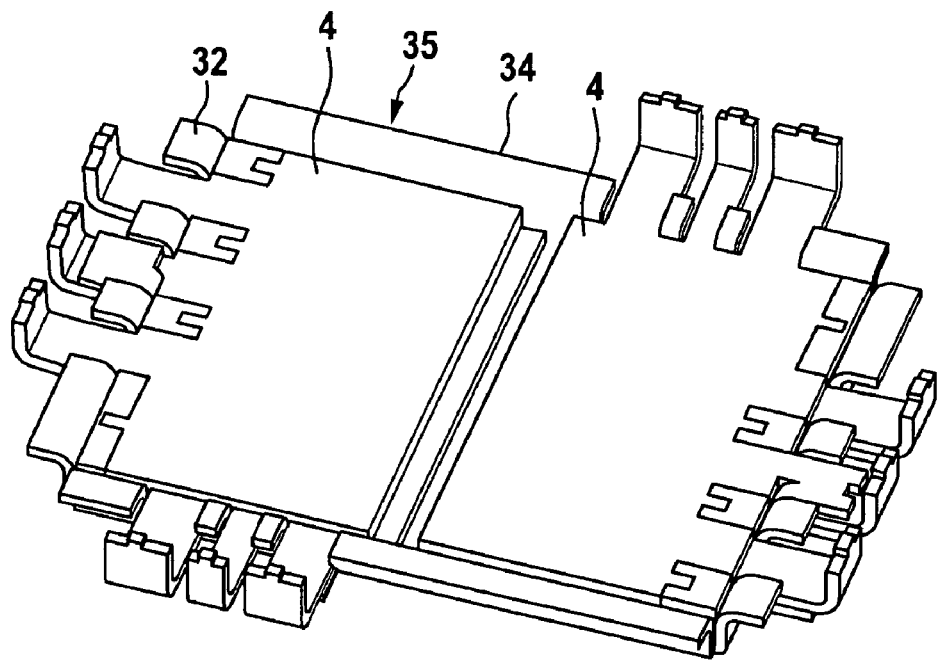

Further advantages and embodiments of the present invention result from the following figures:

FIG. 2 shows an actuating device according to the present invention;

FIG. 2a shows another embodiment of an actuating device according to the present invention;

FIG. 3 shows a power device; and

Figure 4:
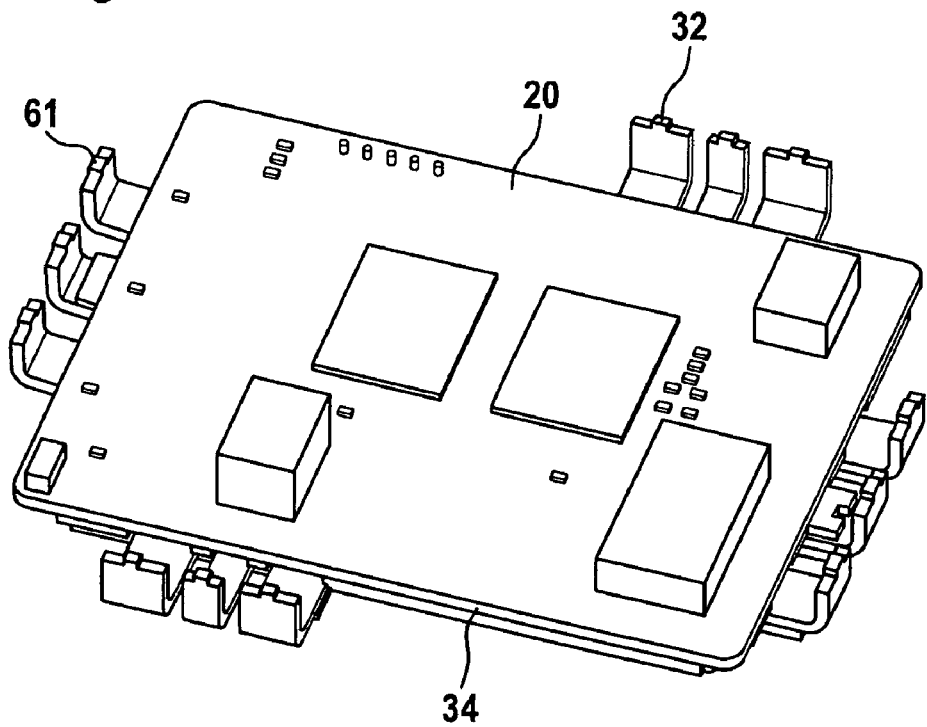

FIG. 4 shows a power device having a logic device mounted on it.

DETAILED DESCRIPTION OF A PREFERRED EMBODIMENT

FIG. 2 shows a device for actuating components according to the present invention. This device also has four electric motors 3, which are accommodated in two housings 5a and 5b. The present invention is, of course, not limited to four motors. The number of housings is not necessarily two. In addition to motors 3, the power device, which is composed of two power devices 4 and one shared logic device for both motors 3, is also accommodated in housing 5a. In this embodiment, the power devices have an essentially identical design. U.S. Pat. Nos. 6,893,371 and 6,785,599 are incorporated by reference herein as showing motors with rotors and stators.

Accommodated in housing 5b are two additional motors 3 as well as control devices in this case, which are composed of two separate power devices 4 and two separate logic devices 6. Also in this embodiment, it would be possible to provide only one control device instead of two control devices. Housing 5b furthermore has a system logic device 20.

Reference numeral 22 refers to a capacitor which is provided for compensating any voltage fluctuations of the voltage coming from the battery. A capacitor of this type may also be situated in housing 5a.

Voltage, i.e., current, is supplied from battery 30 via power leads 11 to the particular motors, power devices, logic devices, and system logic device 20. Reference numeral 13a denotes the first conductor nodes via which the voltage is supplied to the two housings 5a and 5b, i.e., to the devices situated in these housings. Reference numeral 8 denotes, also in this case, a first plug connector via which power is supplied to the devices situated in housings 5a and 5b. Reference numeral 7 denotes a first connecting device.

Reference numeral 11b denotes the first extension lines via which the battery voltage is transmitted to the particular housing. Two conductor nodes 13b are provided in the housing and are used for distributing the battery voltage to power devices 4 and control devices 6. In this case, however, instead of plug-and-socket connections, simple, for example, soldered or glued nodes, which are therefore less sensitive to vibrations, are provided. Therefore, power may be supplied in this embodiment via only four plug contacts, whereas 16 plug contacts are needed in the case of the embodiment shown in FIG. 1. By using a logic device integrated into housing 5b, two plug contacts may be omitted, because logic device 6b and power device 4 may be supplied jointly with power.

A connection between system logic device 20 and motors 3, i.e., their power devices 4, situated in housing 5a, is made possible via second connecting device 17 and second plug connector 18. It is apparent that, apart from the particular power supplies, this is the only connection in this embodiment which is created via plug-and-socket connections and cables. This results in a considerable savings in plug-and-socket connections compared to the embodiment of the related art.

Figure 1:
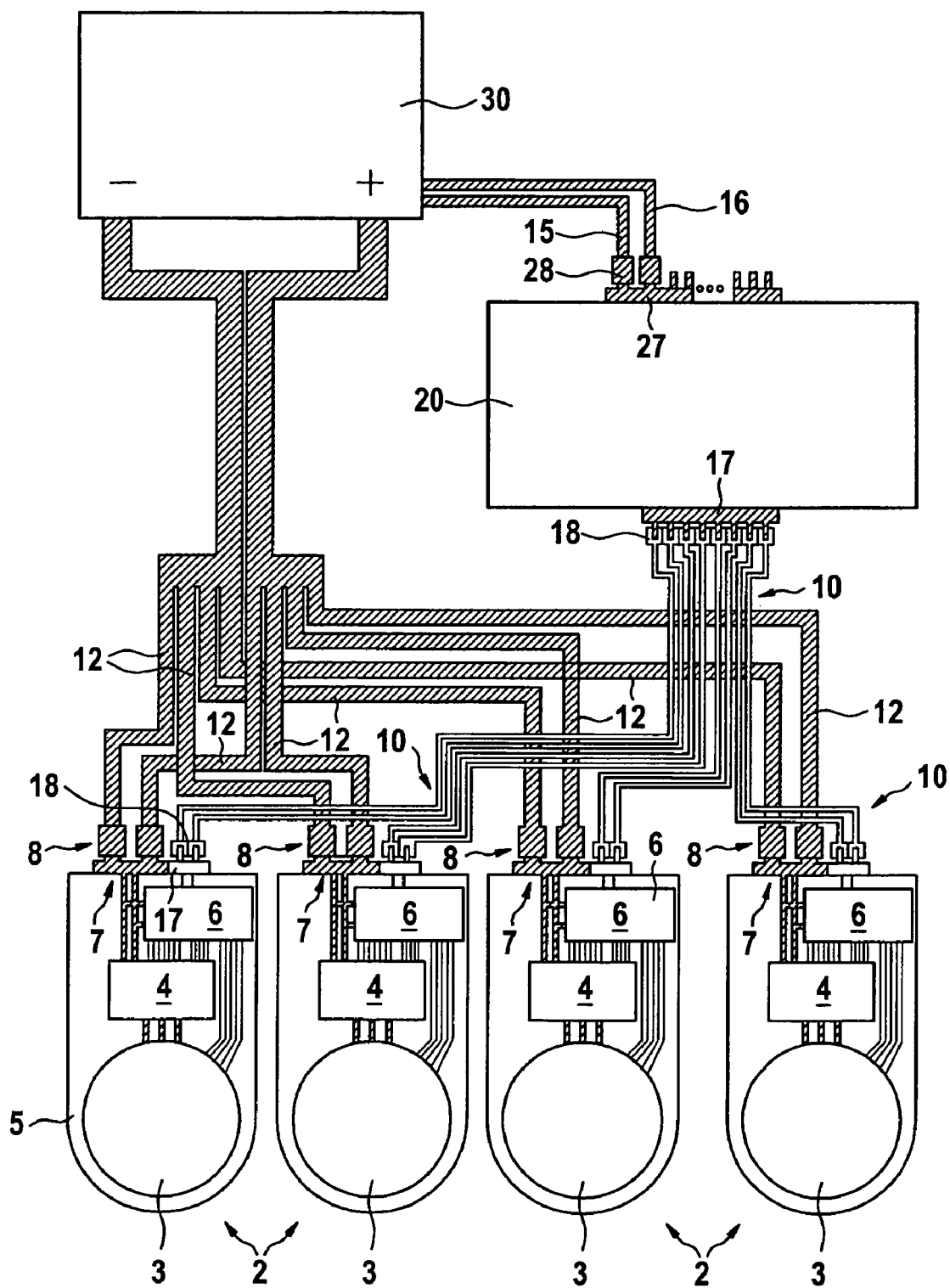
FIG. 1 shows an actuating device according to the related art.

In the embodiment shown in FIG. 1, sixteen plug contacts are needed to achieve connection between the logic devices and the power devices; in contrast, in the embodiment according to the present invention, only four plug contacts are needed.

At least four plug devices 17, 18, which are replaced by more reliable connections inside the housing, are no longer necessary simply by providing an integrated system logic device.

In a further embodiment, a shared housing 5 is provided for all motors, power devices, and the logic device, which also makes bus conductor 10 shown in FIG. 1 unnecessary.

The particular stator unit for motors 3 is also integrated in housings 5a and 5b. The embodiment shown makes plugs, cables, bearings, and gaskets between the stator units and the electronics unnecessary compared to the systems of the related art. The system costs may thus be considerably reduced.

The adaptor connector replaces additional connecting elements between the sensor modules, the stator winding ends, the plugs, the input filter components, and the control device. This is more cost-effective with respect to manufacturing than the sum of the replaced parts. In addition, the adapter connector permits specific adaptation to the given installation spaces, which makes it possible to use expensive components such as the stator units and the control device without modification.

Instead of the internal soldered or glued connection points, simple housings and plugs may also be used for the individual motors. In addition, simple cables, but without plug-and-socket connections (for example, using soldered ends), may also be used for connecting the individual components. It is also possible to provide plug-and-socket connections, in particular insulation piercing connecting devices in the housing, and to also sheathe or encapsulate them with plastic to increase stability.

Another embodiment of the present invention is illustrated in FIG. 2a. In contrast to the embodiment shown in FIG. 2, the system logic device is situated separately from housings 5. In this embodiment, plug-and-socket connections are provided between the two housings 5a and 5b and system logic device 20.

FIG. 3 shows a power device in which the logic device has not yet been mounted. It shows two power devices 4, which may be switched via a plurality of contacts 32. Reference numeral 34 denotes the edge of a trough-shaped cooling device 35. This cooling device 35 has a surface contact to power devices 4, which results in a particularly efficient dissipation of the generated heat.

In addition, cooling device 35 also has a direct contact to those contacts of the power devices which are connected to the windings of the electric motors. The greatest amount of heat is generated at these contacts. Heat dissipation at the contacts prevents the power device from being overheated by a heat flow from the winding, limited by the heat resistance of the conductor.

FIG. 4 shows the control device on which logic device 20 has been mounted. The cooling device also has direct contacts to the heat-conducting elements of logic device 20 over its edges 34. It is apparent that the entire module, i.e., the assembly composed of the power device and logic device 20, is designed as a very flat element, which may be integrated in the individual motor housings in a highly space-saving manner. The interfaces between the power device and logic device 20 are established by surface contacts implemented using conductive adhesive or solder.

The printed conductors between the components of the power device and the logic device are preferably implemented directly on or in plastic elements, the plastic elements in the power device ensuring the positioning of the components, the insulation between different potentials, and thermal separation between the power part and the logic part.

LIST OF REFERENCE NUMERALS 2 electric motor unit
3 electric motor
4 output stage/power devices
5 housing
5a housing
5b housing
6 logic device/control device
7 first connecting device
8 first plug connector
10 bus conductors
11a first power lead
11b first extension line
11c second extension line
11d third extension line
12 second power lead
13a first node
13b second node
15 power lead/leads
16 power lead/leads
17 second connecting device
18 second plug connector
20 system logic device
22 capacitor
27 connecting device
28 plug connector
30 battery
32 contact
34 cooling device edge
35 cooling device

What is claimed is:

1. A device for actuating components of a motor vehicle comprising:
   a first electric motor having at least one first stator unit and one first rotor unit;
   a second electric motor having at least one second stator unit and one second rotor unit; and
   a control device for the first and second electric motors, the control device having at least one logic device and at least one power device, the control device being fixedly connected to at least one component of the first electric motor and at least one component of the second electric motor.

2. The device as recited in claim 1 further comprising a shared housing, the control device and the first and second electric motors being accommodated in the shared housing.

3. The device as recited in claim 1 further comprising a system logic device fixedly connected to at least one component of the first and second electric motors.

4. The device as recited in claim 1 wherein the control device is fixedly connected to the first stator unit of the first electric motor.

5. The device as recited in claim 4 wherein the control device is fixedly connected to the second stator unit.

6. The device as recited in claim 1 wherein the control device includes a plurality of power devices.

7. The device as recited in claim 1 wherein the at least one power device includes a plurality of power devices having an identical design.

8. The device as recited in claim 3 wherein the control device is in contact with the system logic device.

9. The device as recited in claim 1 wherein the contact between the control device and the system logic device is implemented via surface contacts.

10. The device as recited in claim 3 further comprising a shared cooling device, the system logic device and the control device being situated on the shared cooling device.

11. The device as recited in claim 10 wherein the cooling device is in direct contact with heat-conducting elements of the system logic device.

12. The device as recited in claim 3 wherein the system logic device has a flat design.

13. The device as recited in claim 10 wherein the shared cooling device has surface contacts to the control device.

14. The device as recited in claim 3 further comprising a connecting device, the control device and the system logic device being connected to the first and second electric motors via the connecting device.

15. The device as recited in claim 14 wherein the connecting device has one motor shield for each of the first and second electric motors.

16. The device as recited in claim 15 wherein the motor shields are connected to one another to form one piece.

17. The device as recited in claim 15 wherein the first and second stator units are situated on the motor shields.

18. The device as recited in claim 15 further comprising sensor units situated on the motor shields.

19. The device as recited in claim 1 wherein the control device controls additional electric motors additional to the first and second electric motors.

20. The device as recited in claim 2 wherein the shared housing includes an injection molded-element.

21. The device as recited in claim 1 wherein the first and second rotor devices are fixedly connected to the mechanical power transmission devices.

22. A method for actuating a component using the actuating device as recited in claim 1, the method comprising:
   selecting the component from a group of components including gear transmission systems and camshaft adjustment systems; and
   actuating the component.

23. A method for manufacturing an actuating device for components of a motor vehicle comprising the steps of:
   connecting at least one component of at least two electric motors to a control device to form a module; and
   sheathing or encapsulating the module in plastic.

24. The method as recited in claim 23 wherein the connecting at least one component of the at least two electric motors are connected to the control device via a connecting device.

25. The method as recited in claim 23 further comprising sensing with at least one sensor device or connecting at least one plug connector to the control device.

* * * * *